United States Patent
Dhakal et al.

(10) Patent No.: US 9,094,862 B2
(45) Date of Patent: Jul. 28, 2015

(54) ADAPTIVE PILOT PLACEMENT FOR ESTIMATION OF VEHICLE-TO-VEHICLE WIRELESS CHANNEL

(71) Applicant: BlackBerry Limited, Waterloo (CA)

(72) Inventors: Sagar Dhakal, Richardson, TX (US); Nam Nguyen, Irving, TX (US); James Earl Womack, Bedford, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 139 days.

(21) Appl. No.: 13/800,423

(22) Filed: Mar. 13, 2013

(65) Prior Publication Data

US 2014/0269357 A1    Sep. 18, 2014

(51) Int. Cl.
*H04L 12/26* (2006.01)
*H04W 28/06* (2009.01)
*H04L 5/00* (2006.01)
*H04W 24/08* (2009.01)

(52) U.S. Cl.
CPC ............. *H04W 28/06* (2013.01); *H04L 5/0048* (2013.01); *H04W 24/08* (2013.01); *H04L 5/0069* (2013.01)

(58) Field of Classification Search
None
See application file for complete search history.

(56) References Cited

U.S. PATENT DOCUMENTS

| | | | | |
|---|---|---|---|---|
| 7,756,632 | B2 * | 7/2010 | Wise et al. | 701/465 |
| 8,396,169 | B2 * | 3/2013 | Xu et al. | 375/340 |
| 8,761,285 | B2 * | 6/2014 | Addepalli et al. | 375/261 |
| 2011/0280325 | A1 * | 11/2011 | Fernandez et al. | 375/260 |
| 2013/0083679 | A1 * | 4/2013 | Krishnaswamy et al. | 370/252 |
| 2014/0053047 | A1 * | 2/2014 | Li et al. | 714/786 |
| 2014/0241444 | A1 * | 8/2014 | Li et al. | 375/260 |

OTHER PUBLICATIONS

Etsi TR 102638, "Intelligent Transportation Systems (ITS); vehicular communications; basic set of applications ; definitions", v.1.1.1, Jun. 2009.
IEEE P802.11p/D9.0: Part 11: Wireless LAN Medium Access Control (MAC) and Physical Layer (PHY) Specifications: Amendment: Wireless Access in Vehicular Environments (WAVE), Draft 9.0, Sep. 2009.
A. Molisch, F. Tufvesson, J. Karedal, and C. Mecklebbrauker, "A survey on vehicle-to-vehicle propagartion channels", IEEE Wireless Comm. Mag., v. 16, i. 6, pp. 1536-1284 2009.

(Continued)

*Primary Examiner* — Michael J Moore, Jr.
(74) *Attorney, Agent, or Firm* — Jon Gibbons; Fleit Gibbons Gutman Bongini & Bianco P.L.

(57) ABSTRACT

A system and method that may facilitate transmission bandwidth savings in non-stationary vehicle-to-vehicle wireless communication channels. At a transmitting vehicle, a transmitter may adaptively change the number of pilot symbols or pilot rate within a frame based upon the current channel statistics. The transmitter may utilize a look-up table approach to select a best pilot rate based upon current conditions associated with the transmitting vehicle, and/or a new frame structure to transmit pilot rate information. At the receiving vehicle, the receiver may be configured to detect a unique waveform transmitted by the transmitting vehicle to estimate the pilot rate information. Alternatively, the receiver on the receiving vehicle may be configured to predict and verify the pilot rate information from an encoded data symbol embedded within a frame transmitted by the transmitting vehicle, which may entail a detection algorithm using encoded data symbols and/or an estimation algorithm using channel statistics.

20 Claims, 11 Drawing Sheets

(56) References Cited

OTHER PUBLICATIONS

J. Karedal, et. al., "A geometry-based stochastic MIMO model for vehicle-to-vehicle communications", IEEE T. Wireless Comm., v. 8, n. 7, pp. 3646-3657, Jul. 2009.

J. A. Sills, and E. W. Kamen, "Wiener filtering of non-stationary signals based on spectral density functions", IEEE CDC conf., Dec. 1995.

Recent advances in theory and methods for nonstationary signal analysis. In EURASIP journal on advances in signal processing., (Guest Editors: P. Flandrin, A. Napolitano, H. Ozaktas, and D. Thomson), Hindwai publishing corp., 2010.

W. Gardner, "A sampling theorem for nonstationary random process", IEEE T. Inf. Thy., v. 18, i. 6, pp. 808-809, Nov. 1972.

R. Negi, and J. Cioffi, "Pilot tone selection for channel estimation in a mobile OFDM system", IEEE T. Consumer Electronics, v. 44, n. 3, Aug., 1998.

R. A. Silverman, "Locally stationary random processes", IRE T. Inf. Th. v.3, pp. 182-187, 1957.

D. J. Thomson, "Spectral estimation and harmonic analysis", Proc. of IEEE, v. 7, n. 9, pp. 1055-1096, Sep. 1982.

* cited by examiner

ADAPTIVE PILOT PLACEMENT FOR ESTIMATION OF VEHICLE-TO-VEHICLE WIRELESS CHANNEL

FIELD

The present embodiments relate generally to adaptive sampling and estimation of wireless communication channels. More particularly, the present embodiments relate to adaptive non-stationary wireless communications.

BACKGROUND

Direct vehicle-to-vehicle (V2V) communication may be critical in enabling future Intelligent Transportation Systems (ITS). Governments in developed nations around the world are investing heavily in ITS to develop traffic-related safety technologies, while the telecom industry and car manufacturers are jointly working to develop in-vehicle infotainment services. To this end, future vehicles on the road may be equipped with radio units that exchange real-time information to avoid collisions, mitigate traffic jams, or reduce fuel consumption. The Federal Communications Commission (FCC) has mandated 75 MHz of spectrum in the 5.85-5.925 GHz band to be allocated for dedicated short-range communications (DSRC) intended to provide V2V communication coverage within a 300 meter range. The IEEE 802.11 p standard has been proposed for DSRC, and it may use orthogonal frequency division multiplexing (OFDM) at the physical (PHY) layer.

Previous works on non-stationary signal processing have dealt with time-series analysis and forecasting. (See Flandarin et al., *Recent Advances in Theory and Methods for Nonstationary Signal Analysis*, EURASIP J. ADV. SIG. PROC January 2011.) Also, in *A Sampling Theorem for Nonstationary Random Process*, IEEE T. INF. THY., v. 18, i. 6, pp. 808-809, November 1972, Gardener generalized Nyquist sampling theorem to propose a sampling rate that is two times the maximum frequency present in the double Fourier transform of the autocorrelation function of non-stationary stochastic process. However, the sampling rate proposed by Gardener may be too conservative as it is based upon an extreme case frequency. In a V2V channel, the locally maximum frequency may vary significantly as a vehicle moves into different terrains, such as city downtowns, suburban areas, highways, or country roads. If pilot symbols were inserted at the rate proposed by Gardener, then the channel may get over-sampled, which may be very inefficient in terms of spectral efficiency.

The present embodiments, inter alia, may avoid over sampling, reduce wastage of bandwidth, overcome other challenges associated with V2V wireless communications, and/or otherwise facilitate enhanced V2V wireless communications.

BRIEF SUMMARY

The present embodiments address the channel estimation problem for statistically non-stationary V2V channels. A new transmit frame structure may allow a transmitter to adapt its pilot symbol insertion rate at every transmission, and the receiver algorithm to estimate and detect the pilot insertion rate used by the transmitter and compute appropriate channel estimation values. The present embodiments may be applicable for a locally stationary V2V channel, where the channel may be assumed to be wide-sense stationary within one frame, but non-stationary across several frames.

The V2V communication system and method that adapt the pilot insertion rate may include a transmitter on a transmitting vehicle and a receiver on a receiving vehicle. The transmitting vehicle may utilize a look-up table approach to select a best pilot rate based upon current vehicle and other conditions, and/or a new frame structure to transmit pilot rate information. The receiving vehicle may be configured to detect a unique waveform that is transmitted by the transmitting vehicle, and use the unique waveform detected to estimate the pilot rate information. Additionally or alternatively, the receiving vehicle may be configured to predict and verify the pilot rate information from an encoded data symbol within a frame transmitted by the transmitting vehicle, which may entail a detection algorithm using encoded data symbols and/or an estimation algorithm using channel statistics.

In one aspect, a transmission method for vehicle-to-vehicle wireless communication may be provided. The transmission method may include (1) determining a dynamic pilot rate (i.e., an adaptive number of pilot signals) based upon one or more current conditions of, or associated with, a first moving vehicle (e.g., vehicle speed, vehicle location, and/or time of commute); and (2) encoding the dynamic pilot rate within each frame of a transmission transmitted from the first moving vehicle to a second moving vehicle to facilitate transmission bandwidth savings and/or enhanced use of transmission bandwidth.

In another aspect, a reception method for vehicle-to-vehicle wireless communication may be provided. The reception method may include (1) estimating channel values for a received transmission using each of a plurality of possible dynamic pilot rates; (2) using the estimated channel values to decode data symbols in the received transmission, including decoding a decoded pilot rate for each of the plurality of possible dynamic pilot rates; (3) determining a best candidate pilot rate by comparing each decoded pilot rate with the corresponding possible dynamic pilot rate, and (4) using the decoded data symbols associated with the best candidate pilot rate as the data actually transmitted by a remote transmitter such that wireless communication with the remote transmitter and transmission bandwidth savings for the received transmission are facilitated. The reception method may further include (5) when more than one pilot rate qualifies as a best candidate pilot rate in the determining step (suggesting a false positive event), then estimating the best candidate pilot rate by correlating an empirical autocorrelation function to a true autocorrelation function of the vehicle-to-vehicle wireless channel.

In another aspect, a transmission method for vehicle-to-vehicle wireless communication may be provided. The transmission method may include (1) determining a dynamic pilot rate (i.e., an adaptive number of pilot signals) based upon one or more current conditions of, or associated with, a first moving vehicle (e.g., vehicle speed, vehicle location, and/or time of commute); and (2) conveying the dynamic pilot rate to a second moving vehicle by transmitting the dynamic pilot rate along with a corresponding frame of data from the first moving vehicle to the second moving vehicle via a unique waveform or waveform type to facilitate enhanced use of transmission bandwidth and/or transmission bandwidth savings.

In another aspect, a reception method for vehicle-to-vehicle wireless communication may be provided. The reception method may include (1) using a unique waveform or waveform type of a transmission received from a transmitting vehicle as an index to retrieve or select a dynamic pilot rate from a database or list of possible dynamic rates; and (2) selecting appropriate channel estimation values, such as filter weights or coefficients, to match current channel statistics using the dynamic pilot rate information recovered from the transmission transmitted by the transmitting vehicle.

Advantages will become more apparent to those skilled in the art from the following description of the preferred embodiments which have been shown and described by way of illustration. As will be realized, the present embodiments are capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the invention is not limited to the precise arrangements and instrumentalities shown, wherein.

DETAILED DESCRIPTION

Figure 1:
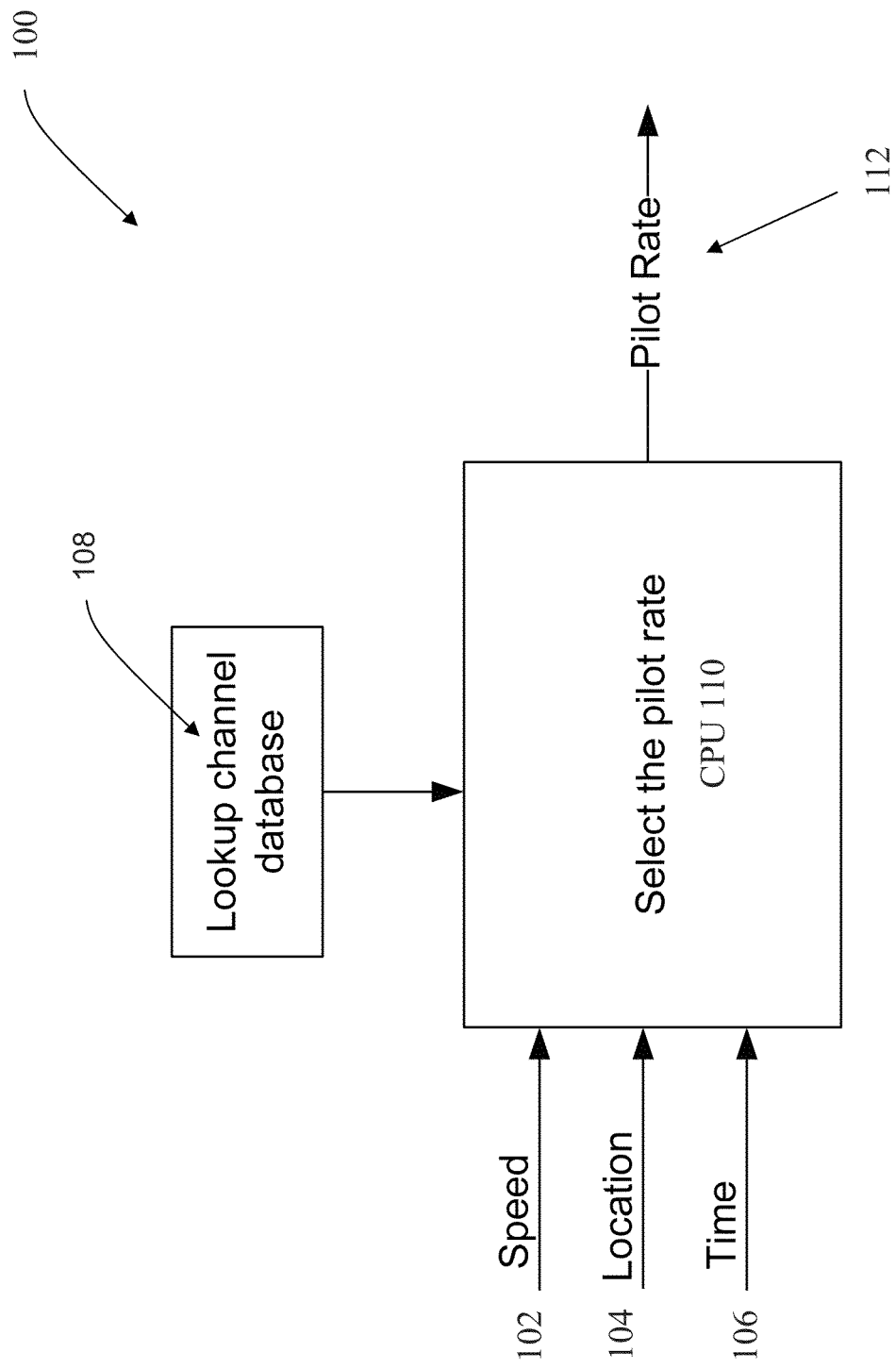
FIG. 1 illustrates an exemplary database approach to adaptively and/or dynamically compute pilot rates at the transmitting vehicle.

The present embodiments relate to adaptive sampling and estimation of non-stationary vehicle-to-vehicle (V2V) wireless channels. The statistics of non-stationary V2V wireless communication channels may change from frame to frame. With the present embodiments, for efficient bandwidth utilization, the transmitter may optimize the number of pilot symbols (i.e., pilot rate) within a frame based upon the current channel statistics of that frame. During non-stationary V2V communication, the pilot rate information may be adaptively updated in each frame at the transmitter and communicated to the receiver along with other information. The channel estimation filter at the receiver may also adapt to the changing statistics of the non-stationary V2V communication channel.

In one aspect, a system and method may adaptively change the pilot rate for each frame to be transmitted and encode the pilot rate information in the same frame at the transmitting vehicle. Additionally or alternatively, a new estimation and detection algorithm may be used at the receiving vehicle to decode the pilot rate information and select channel estimation values to match the current channel statistics.

I. Introduction

One of the major challenges in V2V communication is that the wireless channel between moving vehicles may be hard to track and estimate as the propagation environment is very dynamic. For example, the relative velocity between two communicating vehicles may create an up to four times higher Doppler frequency compared to a cellular channel (the vehicles could be traveling toward one another). The street-level placement of both transmitting and receiving antennas mounted on vehicles, as well as a rapidly changing scattering environment, may lead to a high delay spread in the V2V channel. Moreover, channel sounding experiments have revealed that a V2V channel may have time-varying statistics. The autocorrelation function of the channel and its associated power spectral density may change over time. Thus, the statistical non-stationary property of the V2V channel may be in sharp contrast to the cellular channel, where a wide-sense stationarity of the channel may be a fundamental assumption.

Generally, in order to tackle statistical non-stationarity of the V2V channel, there may be two key changes required in the channel estimation algorithm. Firstly, the sampling rate of the V2V channel may be adapted to the evolution of its Power Spectral Density (PSD). In order to achieve this, the transmitter may insert pilot symbols at different rates for different transmitted frames. Secondly, the channel estimation filter(s) at the receiver may be obtained using a time-varying Wiener Filter that satisfies the non-stationary Wiener-Hopf equation.

In one embodiment, the transmitter may select the pilot insertion rate based upon the local statistics of the channel. Another exemplary adaptive scheme may adjust the channel sampling rate to twice the maximum frequency present in the local PSD.

II. Exemplary Techniques

The present embodiments include a system and method for an adaptive pilot placement scheme that may allow, on a frame-by-frame basis: (i) for the transmitter to adapt its pilot symbol insertion rate based upon the surrounding propagation environment; and/or (ii) for the receiver to identify the pilot insertion rate used by the transmitter and select the appropriate channel estimation filter accordingly.

The present embodiments may be based upon the assumption that the V2V channel is a locally stationary stochastic process over the duration of one transmission frame. For every frame, the pilot symbols may need to be inserted at least at the rate of twice the maximum frequency in the PSD of the V2V channel on that frame. The number of pilot symbols inserted per frame may potentially be different over time as the vehicle moves across different propagation environments. The present embodiments may also include a transmitter configured to adapt its pilot symbol insertion rate at every transmission frame, and a receiver configured to compute appropriate channel estimation values, such as filter weights and/or coefficients, to decode every frame transmitted by the transmitter.

A. Compute Pilot Rate at the Transmitter

The pilot rate may be computed at the transmitting vehicle by directly sounding the channel and estimating the local covariance function of the channel fading process. Alternatively, the pilot rate may be selected or retrieved by each transmitted vehicle from a lookup database using dynamically changing current conditions, such as the speed of the transmitting vehicle, the location of the transmitting vehicle, the time of commute, and/or other changing variables, as inputs. Such a lookup database may be established by performing channel sounding experiments at each real world location or geographical area during different commute times and gathering data.

The rationale behind the utility of location-dependent lookup tables is that V2V communication requires coverage within a 300 meter range. Both the transmitting and the receiving vehicles may be in the vicinity of, and/or be experiencing or under, the same propagation environment. As a result, there may be a high likelihood that both the transmitter and the receiver observe similar fading statistics. Any vehicle may potentially utilize pilot rate information received from other vehicles in the vicinity to determine its own dedicated choice of pilot rates. It should be noted that in this database approach, there may be a finite number of choices for the adaptive pilot rates, whereas in the channel sounding approach, a new pilot rate may be calculated for every stationarity interval of the channel.

FIG. 1 illustrates an exemplary database approach to adaptively computing pilot rates at a transmitter on a transmitting vehicle 100. The database approach may accept a number of dynamically changing variables 102, 104, 106 as inputs to a lookup channel database 108 and include a processor 110 that selects a dynamic pilot rate 112. The dynamically changing variables may include transmitting vehicle speed 102, transmitting vehicle location 104, current time (or time of commute) 106, and/or other variables, such as other variables associated with the transmitting vehicle, weather or environmental conditions, geographical features, and/or variables associated with the receiving vehicle, such as receiving vehicle speed and/or receiving vehicle location.

The dynamically changing variables may be determined by onboard sensors and/or receivers. For instance, vehicle speed 102 may come from the vehicle speedometer, vehicle location 104 may be a Global Positioning System (GPS) location detected by a GPS receiver and/or may include latitude, longitude, and altitude parameters, and current time 106 may be derived from a clock. The database approach to adaptively computing pilot rates at the transmitting vehicle may include additional, fewer, or alternate components and techniques.

B. Communicating Pilot Rate to the Receiver

In order to combat non-stationary fading statistics of the V2V channel, a different pilot symbol insertion rate may be chosen by the transmitter at every frame. Therefore, it may be imperative to inform the receiver about what pilot rate has been used for each transmitted frame. The present embodiments provide two exemplary mechanisms to address this issue.

Figure 2:
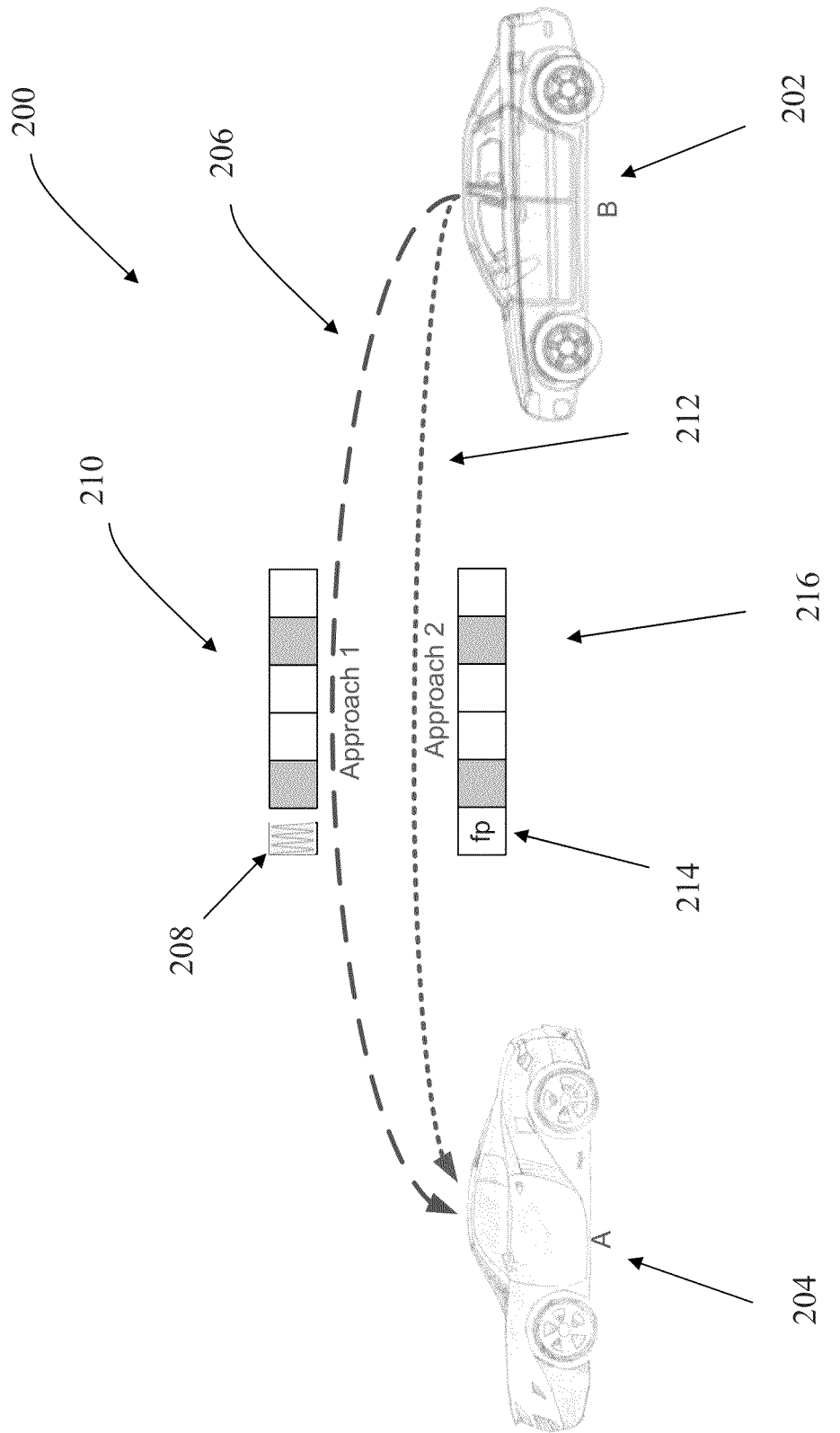
FIG. 2 illustrates two exemplary approaches to sending pilot rate information between moving vehicles using an adaptive pilot placement scheme.

FIG. 2 depicts two exemplary approaches to sending pilot rate information over a non-stationary V2V channel using an adaptive pilot placement scheme 200. Adaptive pilot rates may be determined at a transmitting vehicle 202 and then transmitted over a V2V channel to a receiving vehicle 204.

In the first exemplary adaptive approach 206, unique waveforms or type of waveforms 208 may be transmitted to convey pilot rate information preceding every frame 210. For example, Frequency Modulated (FM) signals or Pseudo Noise (PN) sequences may be used to generate such waveforms. The receiver or receiving vehicle 204 may detect what frequency is transmitted or which PN sequence is used by the transmitter on the transmitting vehicle 202. The receiver may then use that information to infer the pilot rate information actually used by the transmitter on the transmitting vehicle 202.

The second exemplary approach 212 may encode the pilot rate information in one of the data symbols 214 to be transmitted in the same frame 216, as shown in FIG. 2. For example, Quadrature Phase Shift Keying (QPSK) data symbols convey up to four different pilot rates. The location of the pilot rate information carrying data symbol 214 may always be fixed in some embodiments, or may be variable in others. In one embodiment, the preamble in the 802.11 p frame may be utilized to impart the pilot-rate-information. The receiver and/or receiving vehicle 204 may need to decode the data symbol 214 to figure out the pilot rate used by the transmitter and/or the transmitting vehicle 202 for that frame 216. Other approaches may be used to encode the pilot rate information. The algorithm and method that may be utilized to extract the pilot rate information at the receiving vehicle in one embodiment is described below.

C. Extract Pilot Rate Information at Receiver

Based upon the two exemplary approaches of encoding the pilot rate information at the transmitter on the transmitting vehicle discussed above, a receiver on the receiving vehicle may perform decoding accordingly.

1. Extract Pilot Rate Information from the Waveform

In one exemplary extraction approach, a unique waveform (or type of waveform) may represent a unique pilot rate, and the receiver may decode or recognize that waveform (or type of waveform) to extract the pilot rate information. For example, if a Frequency Shift Keying (FSK) signal is used, the receiver may correlate with all FSK waveforms representing the database of pilot rates. Alternatively, if a Pseudo Noise (PN) sequence is transmitted, the receiver may correlate with its bank of PN sequences to find the matched sequence, and hence the equivalent pilot rate. In one aspect, the unique waveform (or type of waveform) may be used as an index to a lookup table, list, queue, stack, tree, database or other data structure that includes all of the possible pilot rates. Alternate types of waveforms may be used in addition to FSK waveforms or PN sequences.

2. Extract Pilot Rate Information from an Encoded Data Symbol

In another exemplary extraction approach, the pilot rate information may be encoded in a designated data symbol within the transmitted frame. In order to determine the pilot rate for that frame, the receiver should correctly decode the designated data symbol. This may not be possible without equalizing the channel. However, typically the channel values may not be available at the receiver before the channel estimation is performed; and in order to perform channel estimation, the receiver needs to know where the pilot symbols are located, i.e., what is the pilot rate for that frame. This may lead to a so-called "chicken and egg" problem. The present embodiments may utilize a pilot rate detection algorithm to resolve this problem.

Figure 3:
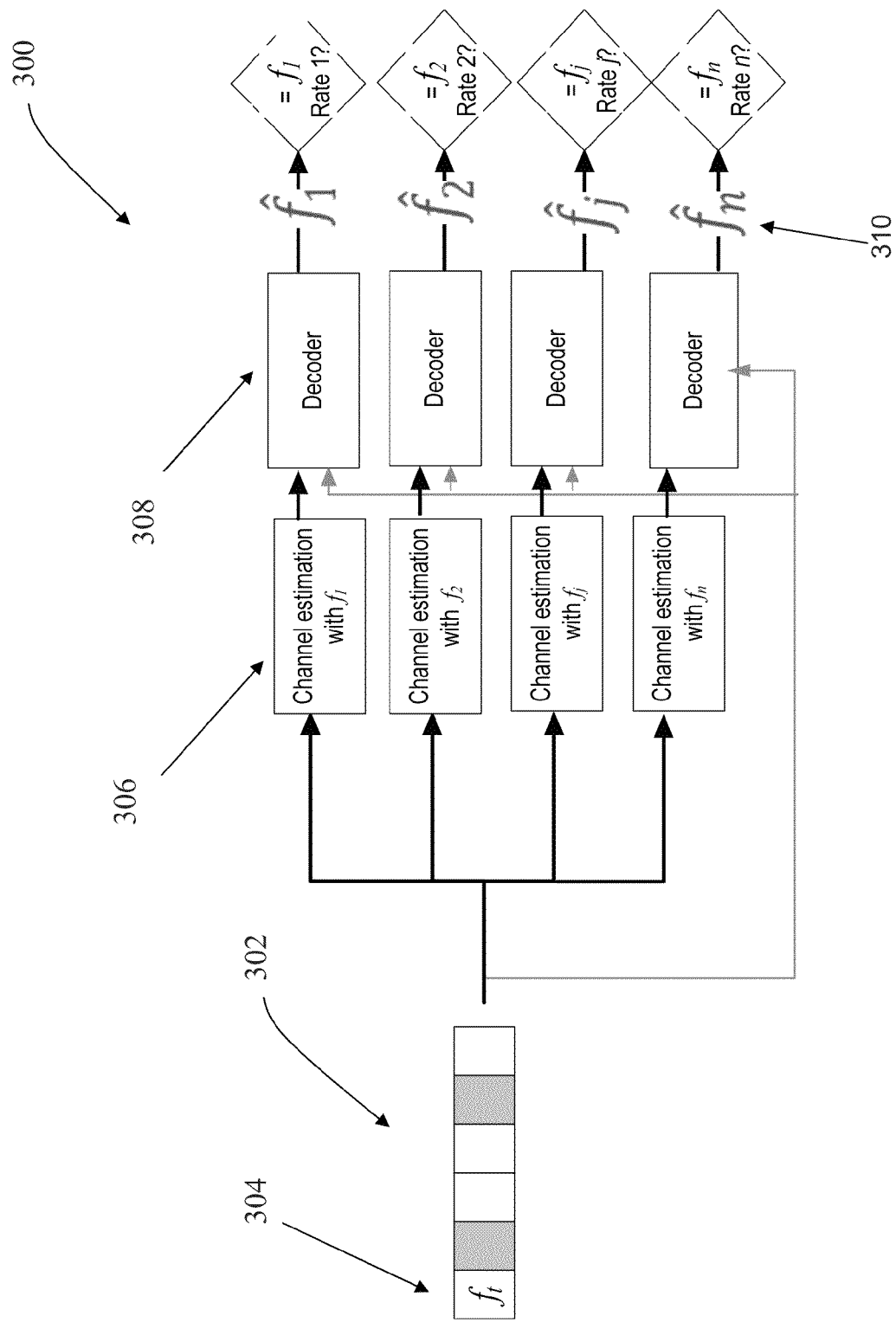
FIG. 3 depicts an exemplary algorithm to jointly detect, at the receiving vehicle, the pilot rate and the data symbols transmitted from the transmitting vehicle.

FIG. 3 depicts an exemplary algorithm that may be utilized at the receiver to jointly detect the pilot rate and the data symbols 300. As shown in FIG. 3, decoding a frame 302 at the receiver may be based upon all or a sub-set of pilot rates that are likely candidate pilot rates. As an example, suppose that there are n distinct pilot rates in a look-up database given by $f_1, f_2, \ldots, f_n$. The transmitter may pick an actual or transmitter pilot rate, say $f_t$, and encode the pilot rate information in a designated data symbol 304 in that frame 302.

Then the receiver may start with potential pilot rates $f_j$, $j=1, 2, \ldots, n$, and pull out the respective received symbols corresponding to the pilot rates. The channel values at the assumed pilot positions will then be utilized to estimate the channel for that frame 306. The estimated channel values 306 will then be used for equalization and decoding some or all of data symbols 308, including the designated symbols that contain the pilot rate information. For instance, suppose that the decoding of the designated data symbol yields a decoded pilot rate $\hat{f}_j$ 310. If $\hat{f}_j=f_j$ (i.e., decoded pilot rate=potential pilot rate), then $f_j$ may be considered to be the correct candidate for the pilot rate, whereas if $\hat{f}_j \neq f_j$ all channel estimates corresponding to pilot rate $f_j$ may be dropped.

The probability of a false negative may be given by Pr$\{\hat{f} \neq f_j | f_j = f_t\}$. Note that when $f_j = f_t$ (i.e., potential pilot rate=transmitted pilot rate), correct pilot symbols will be pulled out and the channel estimation will minimize the mean square error between the channel estimate and the true channel at the data positions. The probability of a false positive is given by $Pr\{\hat{f}_j = f_j \neq f_t\}$. When $f_j \neq f_t$, either some data symbols will be incorrectly picked as pilot symbols or some pilot symbols will be skipped at the receiver. In both situations, the corresponding channel estimates may become useless. Therefore, the decoding of $\hat{f}_j$ may become random, which leads to an undesired floor in the probability of error. The probability of error is the sum of the two types of errors above. More precisely, $$p = Pr\{\hat{f}_j \neq f_j | f_j = f_t\} + \Sigma_j Pr\{\hat{f}_j = f_j | f_j \neq f_t\}. \quad (1)$$

Figure 4:
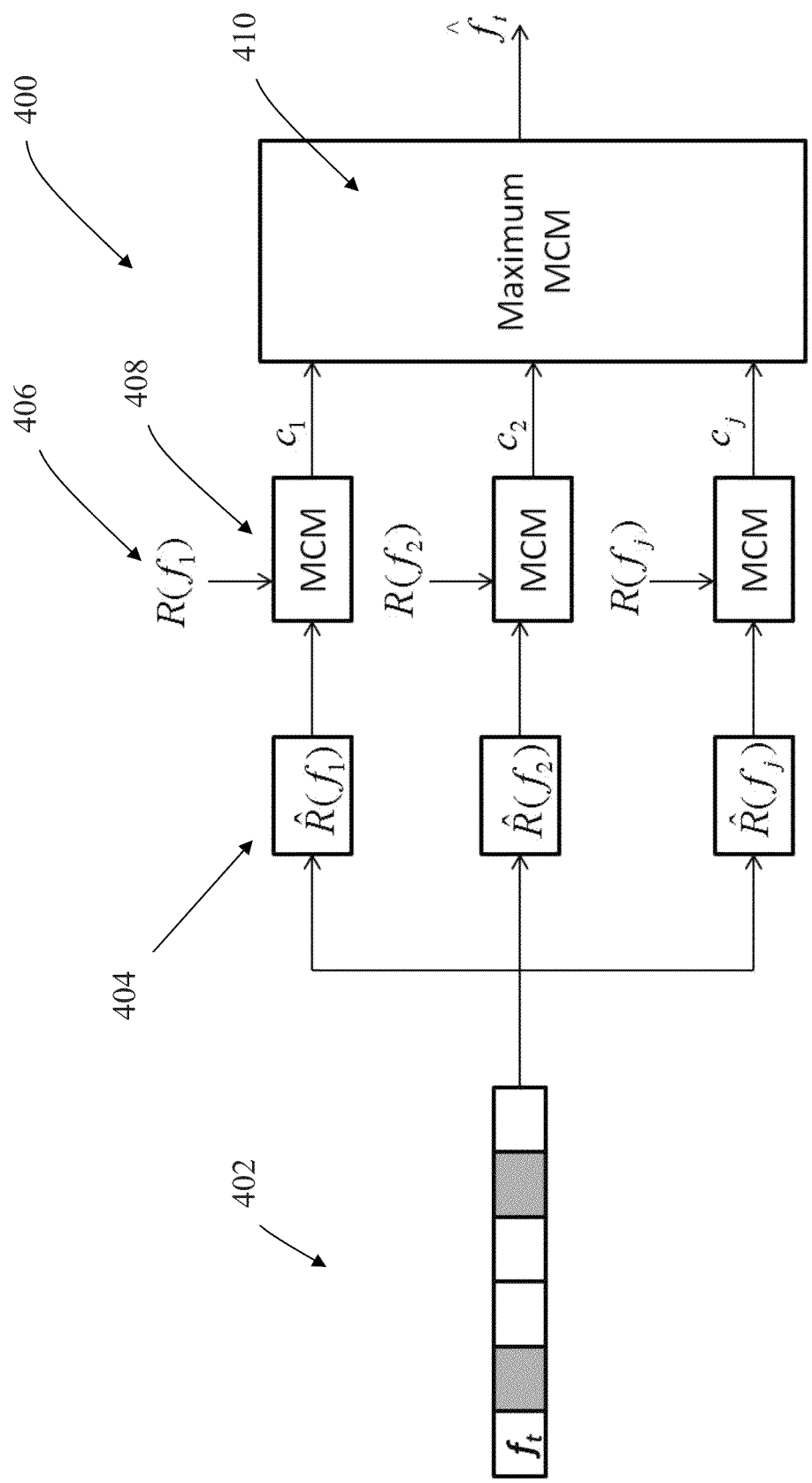
FIG. 4 depicts a block diagram for an exemplary pilot rate estimation algorithm for use at the receiving vehicle.

FIG. 4 illustrates a block diagram of an exemplary pilot rate estimation algorithm 400. In order to mitigate the effect of false positive events that could occur in the detection algorithm described above, the present embodiments may use a separate pilot rate estimation algorithm, such as the exemplary pilot rate estimation algorithm shown in FIG. 4, in conjunction with the exemplary detection algorithm discussed above (graphically depicted by FIG. 3).

The look-up database has a list of pilot rates, as well as autocorrelation matrices for corresponding pilot rates. For each frame 402, the algorithm may start with the potential pilot rate $f_j$, j=1, 2, . . . , n, and pull out received symbols corresponding to the pilot positions for rate $f_j$, such as detailed previously. Next, an empirical one-frame estimate of the local autocorrelation matrix may be computed using channel values at those pilot positions. After which, the Matrix Correlation Metric (MCM) 408 may be computed between the empirical estimate, say $\hat{R}_j$ 404, and true autocorrelation, say $R_j$ 406, for the potential pilot rate $f_j$ as $$c_j = \frac{\text{trace}(\hat{R}_j R_j)}{\|\hat{R}_j\|_F \|R_j\|_F}, \quad (2)$$

where "F" stands for the Frobenius norm of a matrix. The pilot rate that has the maximum MCM 410 may be chosen to be the correct estimate $\hat{f}_t$ of the transmitted pilot rate $f_t$ actually used by the transmitter.

It should be noted that in one embodiment, the estimation algorithm will be triggered only when there is more than one pilot rate that qualifies in the detection step, i.e., there are at least two $f_{j1}$ and $f_{j2}$ that result in $\hat{f}_{j1} = f_{j1}$ (i.e., detected pilot rate$_1$ = potential pilot rate$_1$) and $\hat{f}_{j2} = f_{j2}$ (i.e., detected pilot rate$_2$ = potential pilot rate$_2$). In such a case, one of the detected pilot rates matches a potential pilot rate due to a false positive event. The estimation step may help to identify and drop the false positive pilot rate. Alternate pilot rate estimation algorithms having additional, fewer, or alternate operations may be used other than the exemplary pilot rate estimation algorithm 400 depicted in FIG. 4.

3. Ranking the Likelihood of the Pilot Rates

Figure 5:
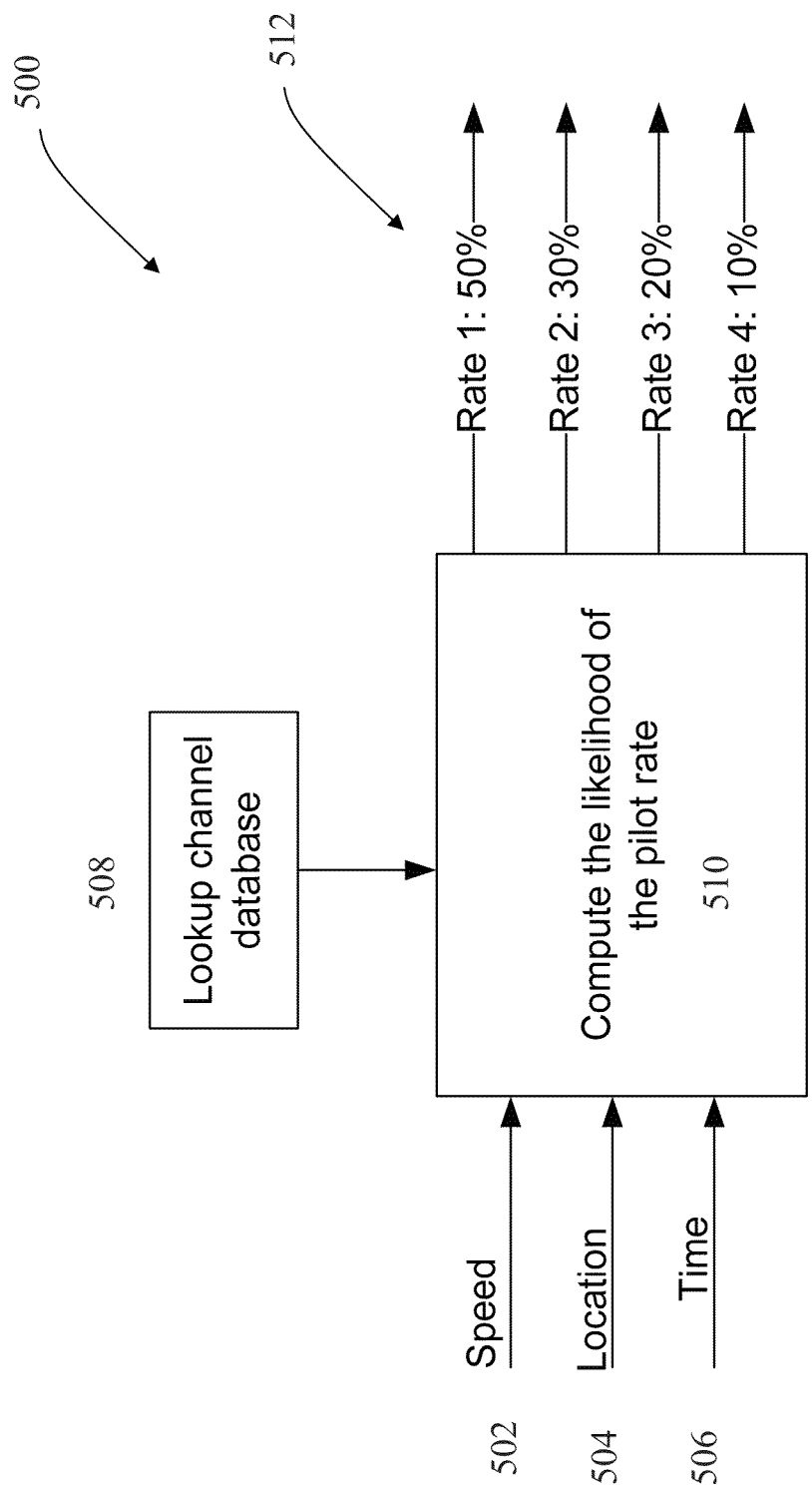
FIG. 5 illustrates computing, at the receiving vehicle, the likelihood of every possible pilot rate being used by the transmitter.

Optionally, the likelihood of each of the potential pilot rates being the actual pilot rate used by the transmitter on the transmitting vehicle may be known a priori and adapted over time by the receiver. FIG. 5 depicts an example of the probability of actual occurrence of every possible pilot rate 500.

In one embodiment, the receiver may utilize receiving vehicle speed 502, current location 504, and current time 506 to estimate the probability of the pilot rates in the lookup database 508. By assuming that transmitting vehicles are in close proximity of the receiving vehicle, the receiver may compute the probability of individual pilot rates actually being used by the transmitting vehicles in its neighborhood 510.

As shown in the exemplary ranking algorithm in FIG. 5, if the receiver knows that there are only four possible pilot rates that the transmitter may use for each frame transmitted, the receiver may calculate 512: a 50% likelihood that potential pilot rate number 1 is the actual pilot rate used by the transmitter; a 30% likelihood for potential pilot rate number 2; a 20% likelihood for potential pilot rate number 3; and a 10% likelihood for potential pilot rate number 4. Alternate ranking algorithms having additional, fewer, or alternate operations may be used other than the exemplary ranking algorithm depicted in FIG. 5.

III. Simulation Results

In order to evaluate performance of the present embodiments, a simulation was performed using a system model specification as per the 802.11 p standard. Table I below provides exemplary system parameters that were relevant for the simulation.

TABLE I

Exemplary 802.11 p System Parameters

| Parameter | Value |
| --- | --- |
| Carrier frequency (f) | 5.9 GHz |
| OFDM symbol duration ($T_{OFDM}$) | 8 micro sec |
| Guard interval | 1.6 micro sec |
| Number of sub-carriers | 52 |
| DFT Sampling Frequency | 8.125 MHz |
| Sub-Carrier Spacing | 156.25 KHz |

Table II below provides specifics of three different exemplary channels used in the simulation. The simulation considered the time-variability of the channel at a given sub-carrier frequency, and treated the fading to be frequency-flat on that sub-carrier.

TABLE II

Exemplary Channel Model

| Channel ID | Speed | Doppler frequency $f_D$ | Fading Model |
| --- | --- | --- | --- |
| Channel-1 | 60 Kmph | 327.78 Hz | Jakes |
| Channel-2 | 100 Kmph | 546.29 Hz | Jakes |
| Channel-3 | 300 Kmph | 1638.9 Hz | Jakes |

In the simulation, a vehicle may receive a frame over any of the three channels given in Table II. Each channel may represent a relative speed between a transmitting and receiving vehicle. For example, Channel-3 may represent a channel between two vehicles moving in opposite directions on an interstate highway.

The Doppler frequency $f_D$ of each channel may be computed using its velocity v and the carrier frequency f. More precisely, $$f_D = \frac{v}{c} f, \quad (3)$$

where c is the speed of light in free space. The Nyquist sampling rate for each channel may be given by $$f_{Nyquist} = \frac{1}{2 f_D T_{OFDM}}, \quad (4)$$

where $T_{OFDM}$ is the Orthogonal Frequency Division Multiplexing (OFDM) symbol duration. In one embodiment, as a rule of thumb, pilots may be inserted at twice the Nyquist rate of the channel.

Figure 6:
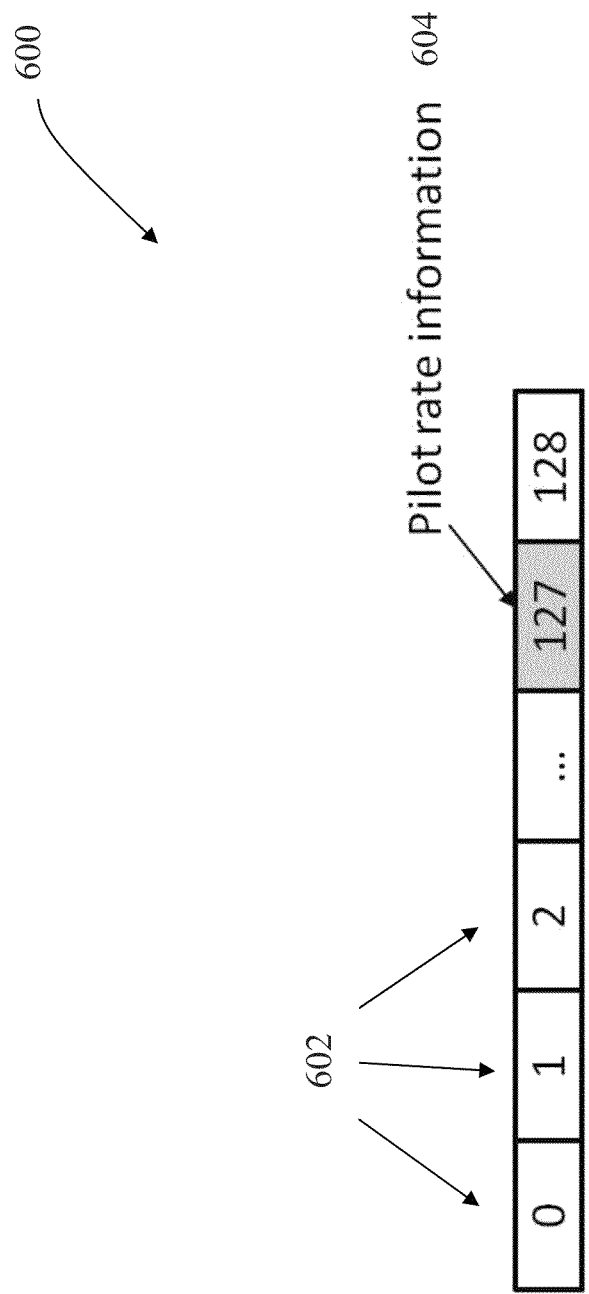
FIG. 6 depicts an exemplary transmit frame structure.

FIG. 6 depicts an exemplary transmit frame structure 600, and exemplary pilot positions for each channel are given below in Table III. Each frame may have, for example, 129 OFDM symbols 602 and pilot rate information 604 may be encoded using a QPSK data symbol and transmitted within the $127^{th}$ symbol position in each frame. The channel may be assumed to be fixed over one OFDM symbol, while it may be changing across multiple OFDM symbols within a frame. Alternate transmit frame structures and pilot positions may be used.

TABLE III

Exemplary Locations of Pilot Symbols

| Channel ID | Pilot Symbol Positions |
|---|---|
| Channel-1 | 0, 64, 128 |
| Channel-2 | 0, 32, 64, 96, 128 |
| Channel-3 | 0, 16, 32, 48, 64, 80, 96, 112, 128 |

Based upon a channel sensing algorithm, the transmitting vehicle may select one of the three pilot rates suitable for sampling the channel perceived by it. The look-up database may have a distinct QPSK symbol representing each pilot rate, the associated autocorrelation matrix, and the channel estimation filter. The autocorrelation matrix for the pilot positions may be given by the zero$^{th}$ order Bessel function:

$$R_{ij} = J_0(2\pi f_D T_{OFDM} |i-j|), \quad (5)$$

and the channel estimation filter for each data position may be given by the Wiener-Hopf equation $$w_d = R^{-1} r_d, \quad (6)$$

where $r_d$ may be the cross-correlation vector between the channel at the $d^{th}$ data position and the channel at the pilot positions.

The received signal per frame may be given by $$y_k = h_k x_k + n_k, \text{ for } k = 0, \ldots, 128. \quad (7)$$

The receiver may use each pilot rate to pull out symbols from corresponding pilot positions, and may compute the channel for the pilot positions using $$\hat{h}_p = \frac{y_k}{x_p}, \quad (8)$$

for all k in the pilot positions for the corresponding pilot rate. Next, the channels for the $d^{th}$ data position may be computed using the corresponding channel estimation filter $w_d$ as $$\hat{h}_d = w_d^t \hat{h}_p. \quad (9)$$

Finally, the data symbol in the $d^{th}$ data position may be decoded/equalized using maximum likelihood criterion, $$\hat{x}_d = \min_{x_{QPSK}} \|y_d - \hat{h}_d x_j\|, \quad (10)$$

for all d in data positions for a corresponding pilot rate.

The decoded data symbol in the $127^{th}$ OFDM symbol position maps to one of the pilot rates, and if this is the same as the pilot rate used in Equation (8) above, then the decoding will be considered correct. If there is more than one pilot rate that results in a correct decoding, then the Matrix Correlation Metric (MCM) given in Equation (2) above may be utilized to break the tie. Further, if no pilot rate results in decoding success, the MCM may be used to pick the most likely pilot rate.

Figure 7:
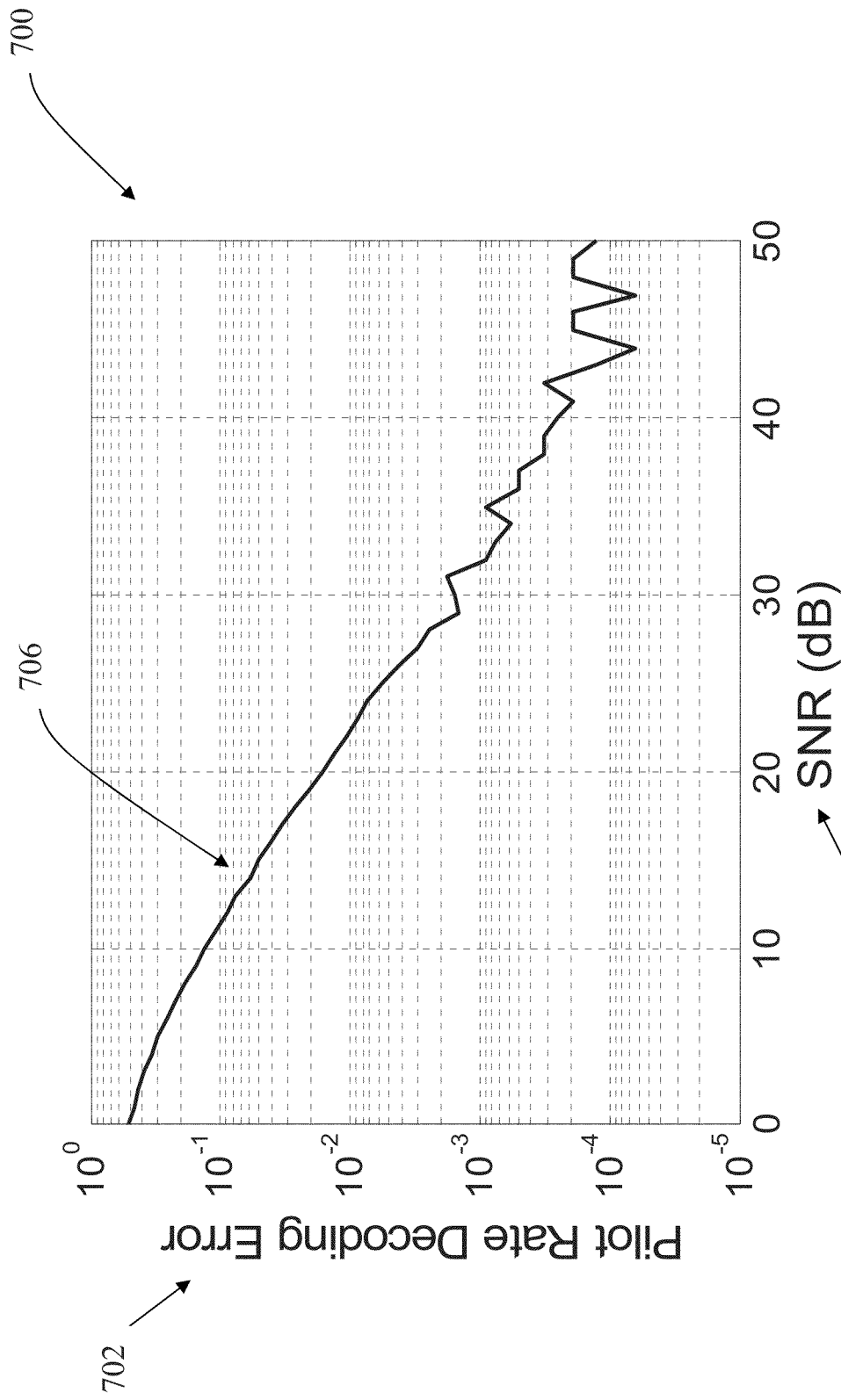
FIG. 7 depicts an exemplary probability of error in the estimation and detection of pilot rate information.

In the simulation, the probabilities of occurrence of Channel-1, Channel-2, and Channel-3 were fixed at 0.4, 0.3, and 0.3, respectively. FIG. 7 shows the error of the proposed receiver algorithm in detecting the pilot rate used by the transmitter at the receiver 700. The graph employs pilot rate decoding error 702 on the y-axis and SNR (Signal-to-Noise Ratio) 704 on the x-axis to depict the probability of error in estimation and detection of pilot rate information 706. Some residual error floor was observed after 45 dB SNR, which may be attributable to residual false positive events even after applying the estimation step of the algorithm. But this may not be an issue as the error rate is already around $10^{-4}$, as shown in FIG. 7.

Figure 8:
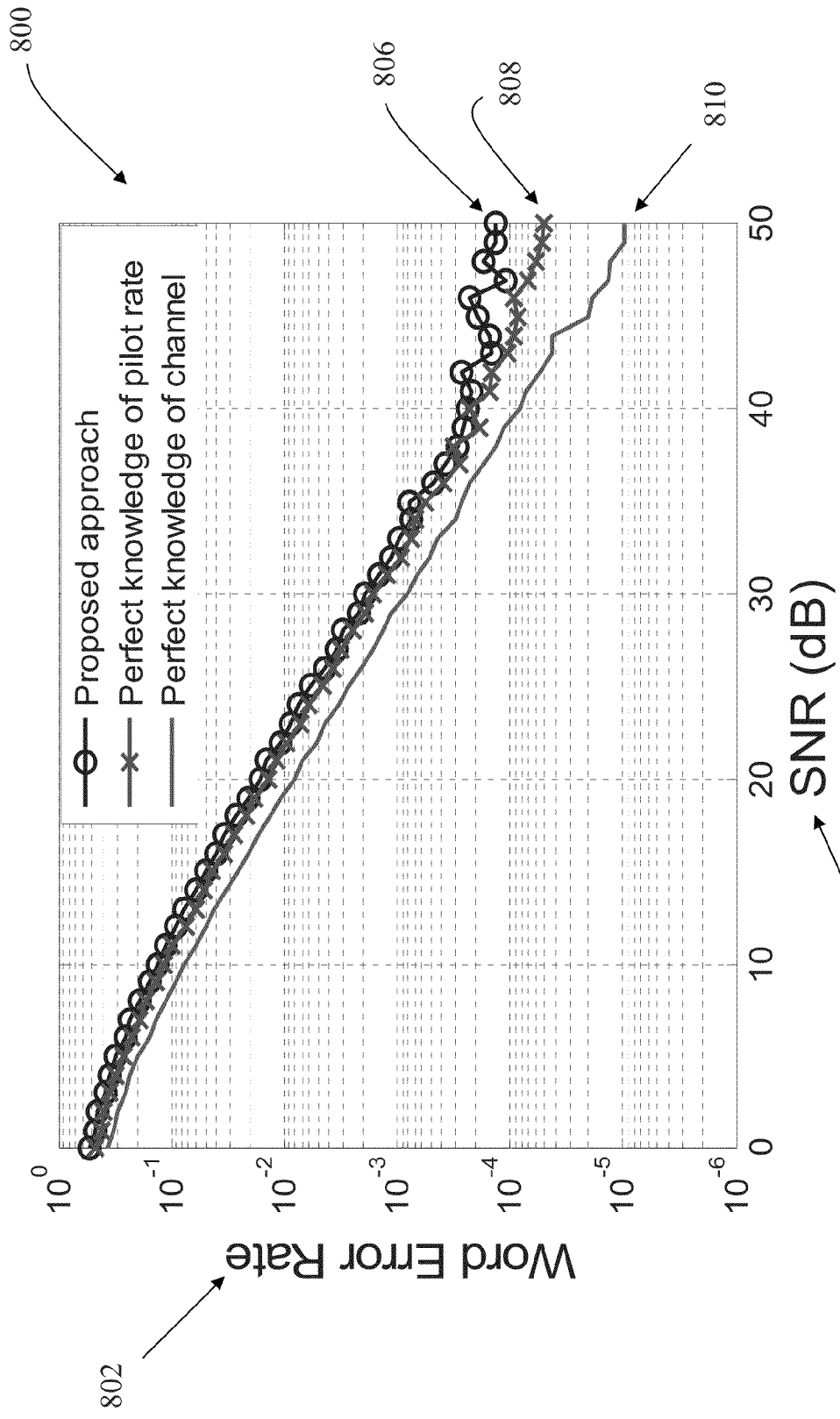
FIG. 8 depicts an exemplary word error rate in the detection of data symbols.

FIG. 8 depicts the word error rate in the detection of data symbols at the receiver 800. In FIG. 8, the x-axis represents word error rate 802 and the y-axis represents SNR 804. The WER performance of the proposed pilot rate decoding algorithm 806 is plotted alongside the WER obtained using the perfect knowledge of the pilot rate at the receiver 808. The close to perfect knowledge of the pilot rate may be achieved by using a dedicated waveform to impart the pilot rate information as discussed above. The proposed scheme of the present embodiments 806 may perform as good as a scheme with the perfect pilot rate information 808. For reference, also shown is the performance of a genie-aided receiver that has knowledge of perfect channel values 810.

Figure 9:
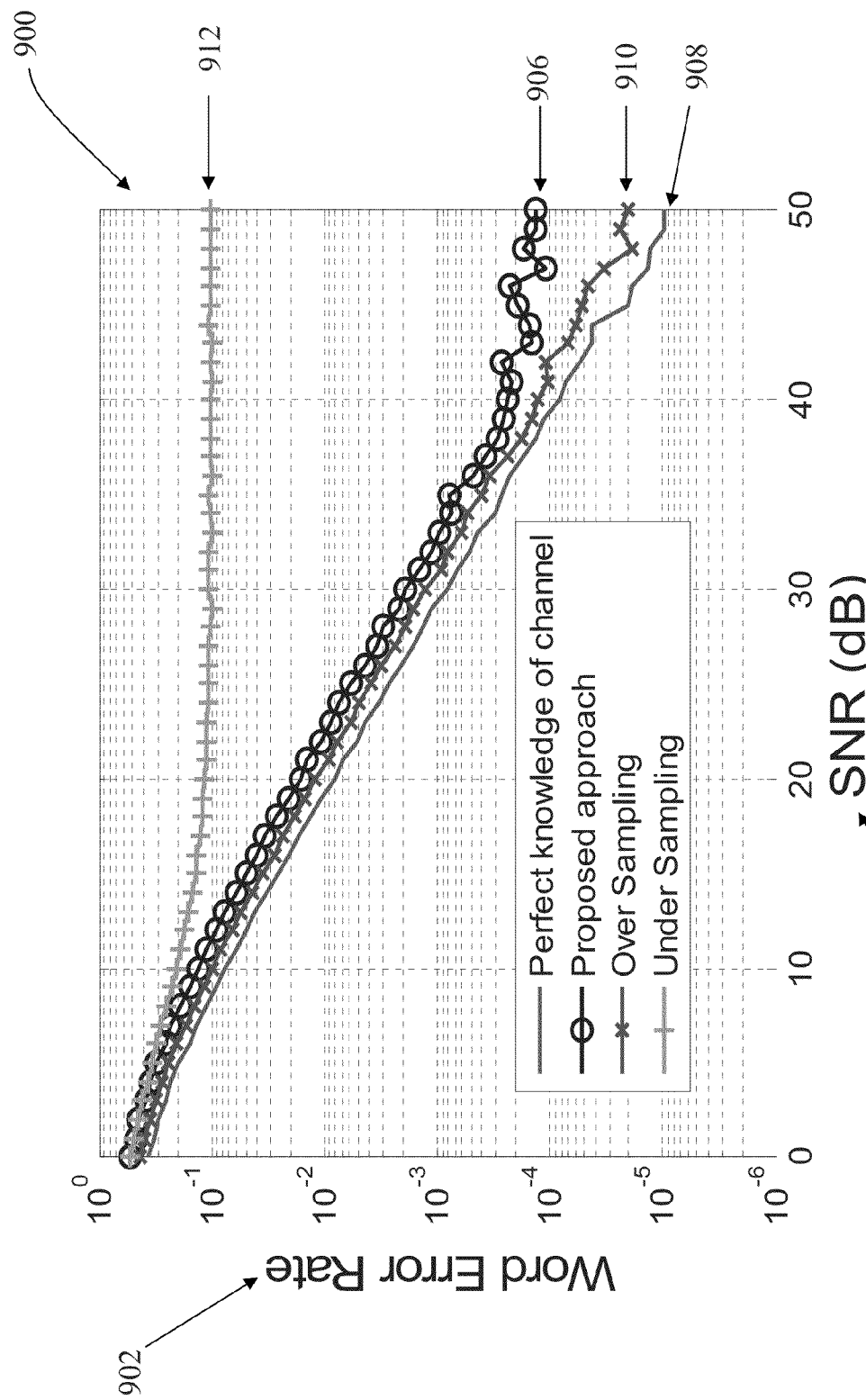
FIG. 9 depicts an exemplary performance comparison between adaptive and fixed pilot insertion rates.

FIG. 9 depicts a performance comparison between adaptive and fixed pilot insertion rates 900. In FIG. 9, the x-axis represents word error rate 902 and the y-axis represents SNR 904. The performance of the present embodiments 906 is compared to fixed pilot rate insertion techniques, as well as a technique having perfect channel knowledge 908. On one extreme, one could always use 9 pilots per frame corresponding to the sampling rate of the fastest Channel-3. This would oversample 910 those frames where the channels are either Channel-1 or Channel-2, which may result in waste of bandwidth. It should be noted that FIG. 9 depicts that the present adaptive pilot placement algorithm 906 may have WER performance approximately similar to that of the oversampled system 910. This result reveals the strength of the present receiver algorithm. On the other extreme, only 3 pilots per frame as in the slowest Channel-1 may be used all the time, which would under-sample 912 Channel-2 and Channel-3 and the performance may become very poor as expected.

The adaptive pilot placement algorithm of the present embodiments may be applied along two dimensions: (i) frequency dimension to perform channel estimation across sub-carriers within one OFDM symbol; and (ii) time dimension to perform channel estimation across different OFDM symbols for a given sub-carrier frequency. While the simulation illustrates using the algorithm along the time-dimension, the algorithm may also be applied along the frequency-dimension.

IV. Exemplary Methods

Noted above, the present embodiments, inter alia, address the problem of adaptive sampling and estimation of non-stationary vehicle-to-vehicle wireless channels. The statistics of V2V wireless communication channels may change from frame to frame. For example, the autocorrelation function of the channel and its associated PSD may change with time. For efficient bandwidth utilization, the transmitter may optimize the number of pilot symbols (i.e., pilot rate) in a frame based upon the current channel statistics in that frame. The pilot rate information may be updated in each frame and communicated to the receiver. The channel estimation filter at the receiver may also adapt to the changing statistics of the channel.

The present embodiments may adaptively change the pilot rate for each frame and encode the pilot rate information in the same frame. It may be assumed that the V2V channel is a locally stationary stochastic process over the duration of one frame. For every frame, the transmitter may compute the local Nyquist rate of the channel and may insert equi-spaced, equi-powered pilot symbols to match the local Nyquist rate.

The present embodiments may also include two approaches to convey the current pilot rate information to receiver. One approach may utilize a dedicated waveform to encode the pilot rate information, while the pilot rate information may be transmitted as part of the data symbols in the other approach. A new estimation and detection algorithm may decode the pilot rate information followed by the decoding of the whole frame.

Figure 10:
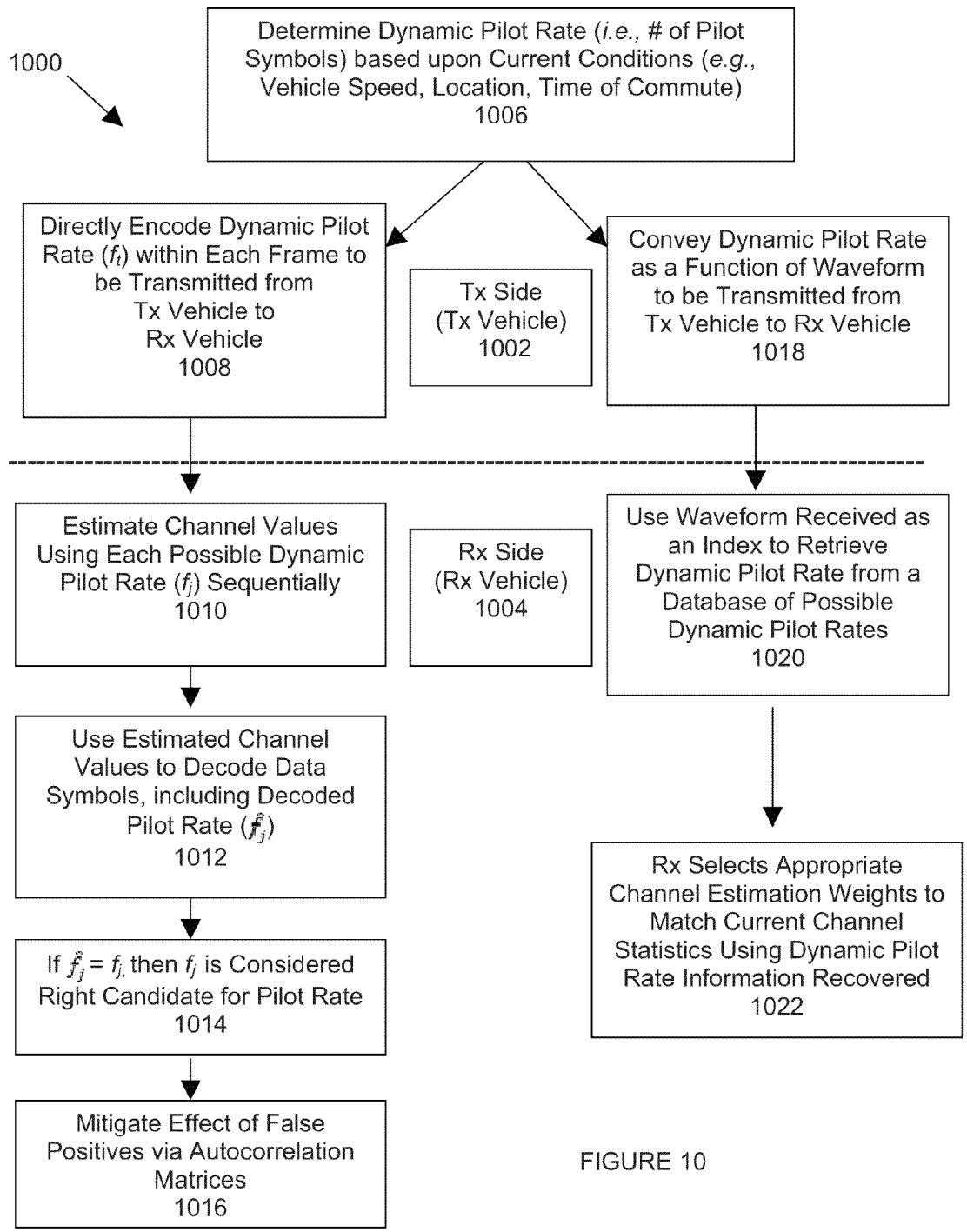
FIG. 10 illustrates exemplary methods of non-stationary wireless communication that may provide transmission bandwidth savings.

FIG. 10 illustrates the two exemplary approaches or methods of non-stationary wireless communication that may provide transmission bandwidth savings 1000. The steps of the exemplary methods depicted in FIG. 10 are broken down as being performed at the transmitter side and/or transmitting vehicle 1002 or at the receiver side and/or receiving vehicle 1004.

As shown in FIG. 10, the first exemplary approach of adaptively changing the pilot rate for a non-stationary channel may first determine a dynamic pilot rate (i.e., number of pilot symbols) based upon current vehicle conditions 1006, such as speed, location, and/or time of commute, at the transmitter side or vehicle 1002. As shown on the right hand side of FIG. 10, the dynamic pilot rate may then be conveyed from the transmitting vehicle to the receiving vehicle as a function of the unique waveform or waveform type selected by the transmitter and transmitted 1018.

At the receiver side and/or vehicle 1004, the receiver may use the unique waveform or waveform type received as an index to select or retrieve a dynamic pilot rate from a database or data structure of possible dynamic pilot rates 1020. After which, the receiver may select one or more appropriate channel estimation values, such as an appropriate channel estimation filter, channel equalization weight or coefficient, or other filter variables, to match current channel statistics using the dynamic pilot rate information recovered 1022.

With the second exemplary approach of adaptively changing the pilot rate for a non-stationary channel, the dynamic pilot rate may similarly be determined based upon current vehicle conditions 1006 at the transmitter side or vehicle 1002. The dynamic pilot rate may then be directly encoded into a signal to be transmitted from the transmitting vehicle 1002 to the receiving vehicle 1004. For instance, the dynamic transmitted pilot rate ($f_t$) may be directly encoded within each frame to be transmitted from the transmitter/transmitting vehicle to the receiver/receiving vehicle 1008.

On the receiver side, the receiver/receiving vehicle 1004 may estimate channel values using each possible dynamic pilot rate ($f_j$) sequentially 1010. For each possible dynamic pilot rate, the receiver may select an appropriate channel estimation filter and/or an appropriate channel equalization weight or coefficient to match current channel statistics. After which, the receiver/receiving vehicle 1004 may then use the estimated channel values to decode data symbols, including a decoded pilot rate ($\hat{f}_j$) 1012. If $\hat{f}_j=f_j$ (i.e., decoded pilot rate=possible dynamic pilot rate), then that possible dynamic pilot rate $f_j$ may be considered the right or best candidate pilot rate for the transmitted dynamic pilot rate actually used by the transmitting vehicle 1014. Once a best candidate pilot rate is determined, the decoded data symbols derived using the best candidate pilot rate in step 1010 above may be used by the receiver or receiving vehicle 1004 as the actual data transmitted by the transmitter or transmitting vehicle 1002 such that wireless communication between the vehicles is facilitated.

The second adaptive approach may also optionally mitigate the effect of false positives. For instance, the effect of false positive dynamic pilot rate matches may be mitigated via autocorrelation matrices 1016, such as explained above. Other mitigation techniques may be used, such as MCM.

In one embodiment, a transmission method for vehicle-to-vehicle wireless communication may be provided. The transmission method may include, at a transmitter on the transmitting or first moving vehicle, (1) determining a dynamic pilot rate based upon one or more current conditions associated with a first moving vehicle; and (2) encoding the dynamic pilot rate in each frame of a transmission transmitted from the first moving vehicle to a second moving vehicle to facilitate enhanced use of transmission bandwidth. The one or more current conditions associated with the first moving vehicle may include speed, location, and current time. The transmission method may also include, at a receiver on the receiving or second moving vehicle, (3) estimating channel values for a received transmission using each of a plurality of possible dynamic pilot rates; (4) using the estimated channel values to decode data symbols in the received transmission, including decoding a decoded pilot rate for each of the plurality of possible dynamic pilot rates; (5) determining a best candidate pilot rate by comparing each decoded pilot rate with the corresponding possible dynamic pilot rate; and (6) using the decoded data symbols associated with or corresponding to the best candidate pilot rate as the data actually transmitted from the transmitting vehicle to facilitate wireless communication between moving vehicles. The channel value or values estimated for each of the plurality of possible dynamic pilot rates may one or more channel equalizer weights and/or coefficients. The transmission method may further include, at the receiver on the receiving or second moving vehicle, (7) estimating a best candidate pilot rate by correlating an empirical autocorrelation function to a true autocorrelation function of the vehicle-to-vehicle wireless channel, such as when more than one pilot rate qualifies as a best candidate pilot rate in the determining step (suggesting a false positive event).

In another embodiment, a reception method for vehicle-to-vehicle wireless communication may be provided. The reception may be performed at a receiving vehicle and a transmission received at the receiving vehicle may be transmitted by a transmitting vehicle. The reception method may include, at a receiver on the receiving vehicle, (1) estimating channel values for a received transmission using each of a plurality of possible dynamic pilot rates; (2) using the estimated channel values to decode data symbols in the received transmission, including decoding a decoded pilot rate for each of the plurality of possible dynamic pilot rates; (3) determining a best candidate pilot rate by comparing the decoded pilot rate with the corresponding possible dynamic pilot rate; and (4) using the decoded data symbols associated with or corresponding to the best candidate pilot rate as the data actually transmitted by the remote transmitter on the transmitting vehicle. As a result, wireless communication with the transmitting vehicle and transmission bandwidth savings for the received transmission may be facilitated. The channel value or values estimated for each of the plurality of possible dynamic pilot rates may be one or more channel equalizer weights and/or coefficients. The reception method may also include, at the receiver on the receiving vehicle, (5) estimating a best candidate pilot rate by correlating an empirical autocorrelation function to a true autocorrelation function of the vehicle-to-vehicle wireless channel, such as when more than one pilot rate qualifies as a best candidate pilot rate in the determining step (suggesting a false positive event). The reception method may further include, at the remote transmitter on the transmitting vehicle, (6) determining a dynamic pilot rate based upon one or more current conditions associated with the transmitting vehicle; and (7) encoding the dynamic pilot rate in each frame of a transmission transmitted from the transmitting vehicle to the receiving vehicle to facilitate enhanced use of transmission bandwidth. The one or more current conditions associated with the transmitting vehicle may include speed, location, and/or time.

In another embodiment, a transmission method for vehicle-to-vehicle wireless communication may be provided. The transmission method may include, at a transmitter on a moving, transmitting vehicle, (1) determining a dynamic pilot rate based upon one or more current conditions associated with the moving, transmitting vehicle; and (2) conveying the dynamic pilot rate to a moving, receiving vehicle by transmitting the dynamic pilot rate along with a corresponding frame of data from the moving, transmitting vehicle to the moving, receiving vehicle via a unique waveform to facilitate enhanced use of transmission bandwidth. The one or more current conditions associated with the moving, transmitting vehicle may include vehicle speed, location, and/or time. The unique waveform may be a PN sequence or a FM signal. The transmission method may further comprise, at the receiver on the moving, receiving vehicle, (3) using the unique waveform received from the moving, transmitting vehicle as an index to retrieve a dynamic pilot rate from a database of possible dynamic rates; and (4) selecting at least one appropriate channel estimation value to match current channel statistics using the dynamic pilot rate information recovered from the transmission from the moving, transmitting vehicle. The at least one appropriate channel estimation value may be a channel filter, channel equalizer weight or coefficient, or other variable.

In another embodiment, a reception method for vehicle-to-vehicle wireless communication may be provided. The reception method may include, at a receiver on a receiving vehicle, (1) using a unique waveform or waveform type of a transmission received from a transmitting vehicle as an index to retrieve or select a dynamic pilot rate from a database or list of possible dynamic rates; and (2) selecting one or more appropriate channel estimation values, such as a channel equalization weight or coefficient, to match current channel statistics using the dynamic pilot rate information recovered from the transmission transmitted by the transmitting vehicle to facilitate communication between moving vehicles.

V. Exemplary Transceiver

Figure 11:
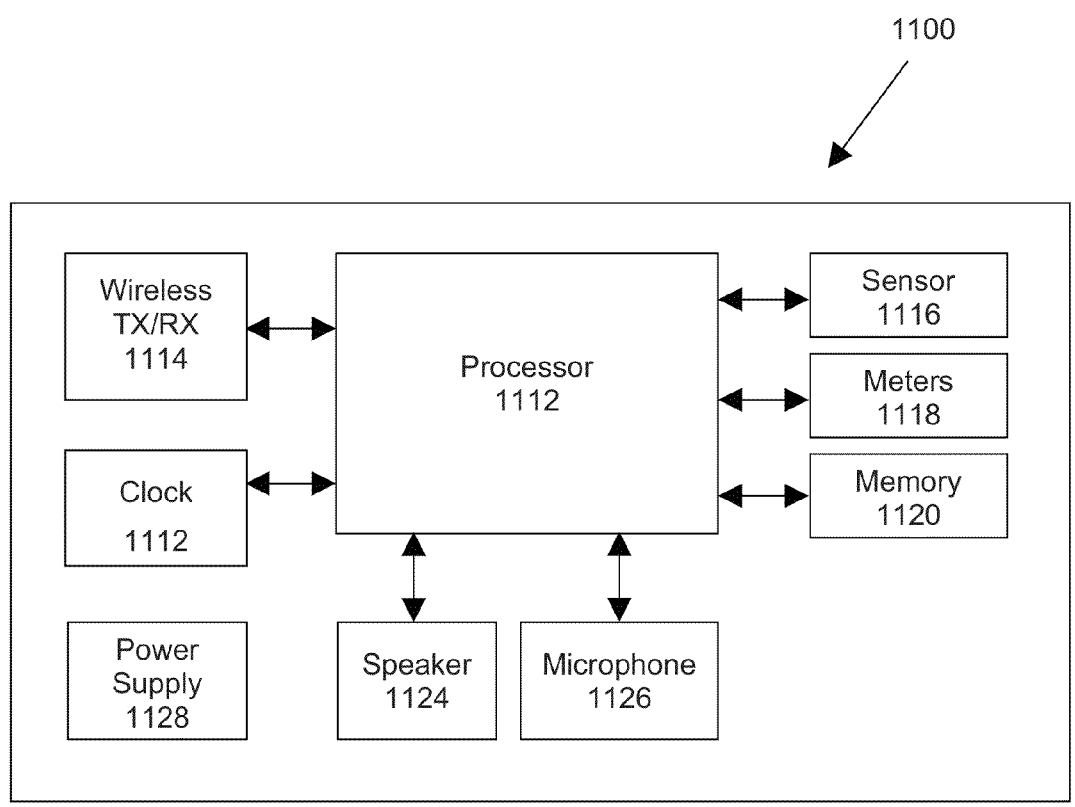
FIG. 11 illustrates an exemplary transceiver for use with non-stationary wireless communication.

The adaptive methods and approaches discussed herein may be implemented via a transmitter and/or transmitting vehicle on the transmit side, and a receiver and/or receiving vehicle on the receive side. For instance, FIG. 11 depicts an exemplary transceiver 1100.

The exemplary transceiver 1100 may include a processor 1112, a wireless radio frequency transmitter and/or receiver 1114, a sensor 1116, one or more meters 1118, a memory 1120, a clock 1112, a speaker 1124, a microphone 1126, and a power supply 1128. The transmitter and/or receiver 1100 may include additional, different, or fewer components.

The processor 1112 may be configured to perform the methods, algorithms, and approaches disclosed herein. One or more programs may reside on the memory 1120 and include one or more sequences of executable code or coded instructions that may be executed by a CPU (Central Processing Unit) or processor 1112. The program may be loaded into the memory 1120 from a storage device. The processor 1112 may execute one or more sequences of instructions of the program to process data. The program and other data may be stored on or read from machine-readable medium, including secondary storage devices such as hard disks, floppy disks, CD-ROMS, and DVDs; electromagnetic signals; or other forms of non-transitory machine readable medium, either currently known or later developed.

The sensor 1116 may be a speed sensor, a Global Positioning System (GPS) receiver, and/or other sensors. The meter 1118 may include a speed meter, an altimeter, and/or other meters. The memory 1120 may include instructions and programs for performing the method, algorithms, and/or approaches discussed herein and may also include maps and vehicle navigation instructions and programs. Other embodiments may be used.

In one aspect, the present embodiments may include a transmitter means on a transmitting vehicle and a receiver means on a receiving vehicle. The transmitter means may include a transmitter, receiver, transceiver, processor, memory, and/or other components, including those of FIG. 11. Similarly, the receiver means may include a receiver, transmitter, transceiver, processor, memory, and/or other components, including those of FIG. 11.

In one embodiment, a transmitting vehicle may have a transmitter means for (1) determining a dynamic pilot rate based upon one or more current conditions associated with the transmitting vehicle; and (2) encoding the dynamic pilot rate in each frame of a transmission transmitted to a receiving vehicle to facilitate enhanced use of transmission bandwidth. The transmitter means may use one or more current conditions associated with the transmitting vehicle, such as the vehicle speed, location, and/or current time, to select the dynamic pilot rate.

The transmitter means may work in conjunction with a receiving vehicle. The receiving vehicle may include a receiver means for (a) estimating channel values for a received transmission using each of a plurality of possible dynamic pilot rates; (b) using the estimated channel values to decode data symbols in the received transmission, including decoding a decoded pilot rate for each of the plurality of possible dynamic pilot rates; (c) determining a best candidate pilot rate by comparing each decoded pilot rate with the corresponding possible dynamic pilot rate; and (d) using the decoded data symbols associated with the best candidate pilot rate as the data actually transmitted by the transmitter means to facilitate wireless communication between moving vehicles. The channel value(s) estimated for each of the plurality of possible dynamic pilot rates may be one or more channel equalizer weights and/or coefficients. The receiving vehicle may also include a receiver means for (e) estimating a best candidate pilot rate by correlating an empirical autocorrelation function to a true autocorrelation function of the vehicle-to-vehicle wireless channel, such as when more than one pilot rate qualifies as a best candidate pilot rate in the determining step (suggesting a false positive event).

In another embodiment, a transmitting vehicle may include a transmitter means for (1) determining a dynamic pilot rate based upon one or more current conditions associated with the transmitting vehicle; and (2) conveying the dynamic pilot rate to a receiving vehicle by transmitting the dynamic pilot rate along with a corresponding frame of data to the receiving vehicle via a unique waveform or waveform type to facilitate enhanced use of transmission bandwidth. The one or more current conditions may include transmitting vehicle speed, location, and/or time. The unique waveform may be a PN sequence or a FM signal.

In another embodiment, a receiving vehicle may include a receiver means for (1) using a unique waveform or waveform type of a transmission received from a transmitting vehicle as an index to retrieve or select a dynamic pilot rate from a database or list of possible dynamic rates; and (2) selecting one or more appropriate channel estimation values, such as a filter, filter weight and/or coefficient, to match current channel statistics using the dynamic pilot rate information recovered from the transmission transmitted by the transmitting vehicle.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A transmission method for vehicle-to-vehicle wireless communication, the transmission method comprising:
  (1) determining a dynamic pilot rate based upon one or more current conditions associated with a first moving vehicle; and
  (2) encoding the dynamic pilot rate in each frame of a transmission transmitted from the first moving vehicle to a second moving vehicle to facilitate enhanced use of transmission bandwidth.

2. The transmission method of claim 1, wherein the one or more current conditions associated with the first moving vehicle comprise speed of the first moving vehicle, location of the first moving vehicle, and time of the commute.

3. The transmission method of claim 2, the transmission method further comprising, at a receiver on the second moving vehicle:
  (3) estimating channel values for the transmission transmitted from the first moving vehicle and received at the second moving vehicle using each of a plurality of possible dynamic pilot rates;
  (4) using the estimated channel values to decode data symbols in the received transmission, including decoding a decoded pilot rate for each of the plurality of possible dynamic pilot rates;
  (5) determining a best candidate pilot rate by comparing each decoded pilot rate with the corresponding possible dynamic pilot rate; and
  (6) using the decoded data symbols associated with the best candidate pilot rate as the data actually transmitted from the first moving vehicle to facilitate wireless communication between moving vehicles.

4. The transmission method of claim 3, the transmission method further comprising, at the receiver on the second moving vehicle:
  (7) estimating a best candidate pilot rate by correlating an empirical autocorrelation function to a true autocorrelation function of the vehicle-to-vehicle wireless channel when a false positive event is identified.

5. The transmission method of claim 3, wherein the channel values estimated for each of the plurality of possible dynamic pilot rates are channel equalizer weights or coefficients.

6. The transmission method of claim 1, the transmission method further comprising, at a receiver on the second moving vehicle:
  (3) estimating channel values for the transmission transmitted from the first moving vehicle and received at the second moving vehicle using each of a plurality of possible dynamic pilot rates; and
  (4) using the estimated channel values to decode data symbols in the received transmission, including decoding a decoded pilot rate for each of the plurality of possible dynamic pilot rates.

7. The transmission method of claim 6, the transmission method further
  comprising, at the receiver on the second moving vehicle:
  (5) determining a best candidate pilot rate by comparing the decoded pilot rate with the corresponding possible dynamic pilot rate; and
  (6) using the decoded data symbols associated with the best candidate pilot rate as the data actually transmitted from the first moving vehicle to facilitate wireless communication between moving vehicles.

8. The transmission method of claim 7, the transmission method further comprising, at the receiver on the first moving:
  (7) estimating a best candidate pilot rate by correlating an empirical autocorrelation function to a true autocorrelation function of the vehicle-to-vehicle wireless channel when a false positive event is identified.

9. A reception method for vehicle-to-vehicle wireless communication, the reception method comprising:
  (1) estimating channel values for a transmission received from a transmitting vehicle using each of a plurality of possible dynamic pilot rates;
  (2) using the estimated channel values to decode data symbols in the received transmission, including decoding a decoded pilot rate for each of the plurality of possible dynamic pilot rates;
  (3) determining a best candidate pilot rate by comparing the decoded pilot rate with the corresponding possible dynamic pilot rate; and
  (4) using the decoded data symbols associated with the best candidate pilot rate as the data actually transmitted by the transmitting vehicle such that wireless communication with the transmitting vehicle and transmission bandwidth savings for the received transmission are facilitated.

10. The reception method of claim 9, the reception method further comprising (5) estimating a best candidate pilot rate by correlating an empirical autocorrelation function to a true autocorrelation function of the vehicle-to-vehicle wireless channel when a false positive event is identified.

11. The reception method of claim 9, wherein the channel values estimated for each of the plurality of possible dynamic pilot rates are channel equalizer weights or coefficients.

12. The reception method of claim 9, wherein the reception is performed at a receiving vehicle and the receiving and transmitting vehicles are moving.

13. The reception method of claim 12, wherein a transmitter on the transmitting vehicle:
  (6) determines a dynamic pilot rate based upon one or more current conditions associated with the transmitting vehicle; and (7) encodes the dynamic pilot rate in each frame of a transmission transmitted from the transmitting vehicle to the receiving vehicle to facilitate enhanced use of transmission bandwidth.

14. The reception method of claim 13, wherein the one or more current conditions associated with the transmitting vehicle comprise speed of the transmitting vehicle, location of the transmitting vehicle, and time of commute.

15. A transmission method for vehicle-to-vehicle wireless communication, the transmission method comprising:
    (1) determining a dynamic pilot rate based upon one or more current conditions associated with a first moving vehicle; and
    (2) conveying the dynamic pilot rate to a second moving vehicle by transmitting the dynamic pilot rate along with a corresponding frame of data from the first moving vehicle to the second moving vehicle via a unique waveform to facilitate enhanced use of transmission bandwidth.

16. The transmission method of claim 15, wherein the one or more current conditions associated with a first moving vehicle comprise speed of the first moving vehicle, location of the first moving vehicle, and time of commute.

17. The transmission method of claim 16, wherein the unique waveform is a Pseudo Noise (PN) sequence.

18. The transmission method of claim 16, wherein the unique waveform is a Frequency Modulated (FM) signal.

19. The transmission method of claim 16, the transmission method further comprising, at a receiver on the second moving vehicle:
    (3) using the unique waveform received from the first moving vehicle as an index to retrieve a dynamic pilot rate from a database of possible dynamic rates; and
    (4) selecting at least one appropriate channel estimation value to match current channel statistics using the dynamic pilot rate information recovered from a transmission from the first moving vehicle.

20. The transmission method of claim 19, wherein the at least one appropriate channel estimation value is a channel filter weight or coefficient.

* * * * *